United States Patent

Bisaillon et al.

[11] Patent Number: 5,924,708
[45] Date of Patent: Jul. 20, 1999

[54] WHEELBARROW

[75] Inventors: Gerard J. Bisaillon, Magog; Rolland Bisaillon, Racine, both of Canada

[73] Assignee: Les Aciers Robond Inc., Magog, Canada

[21] Appl. No.: 08/800,045

[22] Filed: Feb. 14, 1997

[30] Foreign Application Priority Data

Feb. 15, 1996 [CA] Canada .................................. 2169578

[51] Int. Cl.⁶ .................................................. B62B 1/20
[52] U.S. Cl. ........................... 280/47.26; 280/653; 298/2
[58] Field of Search .................................. 280/653, 652, 280/47.26, 47.24, 47.31, 93.51, 93.513, 93.514, 63; 298/3, 2

[56] References Cited

U.S. PATENT DOCUMENTS

| | | | |
|---|---|---|---|
| 2,559,142 | 7/1951 | Woodworth | 280/103 |
| 3,066,945 | 12/1962 | Prescott | 280/47.11 |
| 3,552,760 | 1/1971 | Sine | 280/653 |
| 4,203,609 | 5/1980 | Mitchell et al. | 280/47.11 |
| 4,333,617 | 6/1982 | Hamilton | 242/399 |
| 5,149,116 | 9/1992 | Donze et al. | 280/47.26 |

*Primary Examiner*—Richard M. Camby
*Assistant Examiner*—Avraham H. Lerner
*Attorney, Agent, or Firm*—George A. Seaby

[57] ABSTRACT

Conventional wheelbarrow are difficult to steer, particularly when fully loaded. The wheelbarrow of the present invention provides a simple solution to this problem. The wheelbarrow includes a pair of L-shaped axles carrying wheels (or skis for winter use) rotatably mounted in vertical sleeves on the frame of the wheelbarrow. A crossbar on the front end of a pair of handles carries a shaft rotatable in cylindrical bushings on the frame. A linkage connects the front end of the shaft to levers on the vertical arms of the axles, so that rotation of the handles results in rotation of the shaft and consequently rotation of the axles and wheels around the vertical axes of the vertical arms of the sleeves to steer the wheelbarrow.

14 Claims, 5 Drawing Sheets

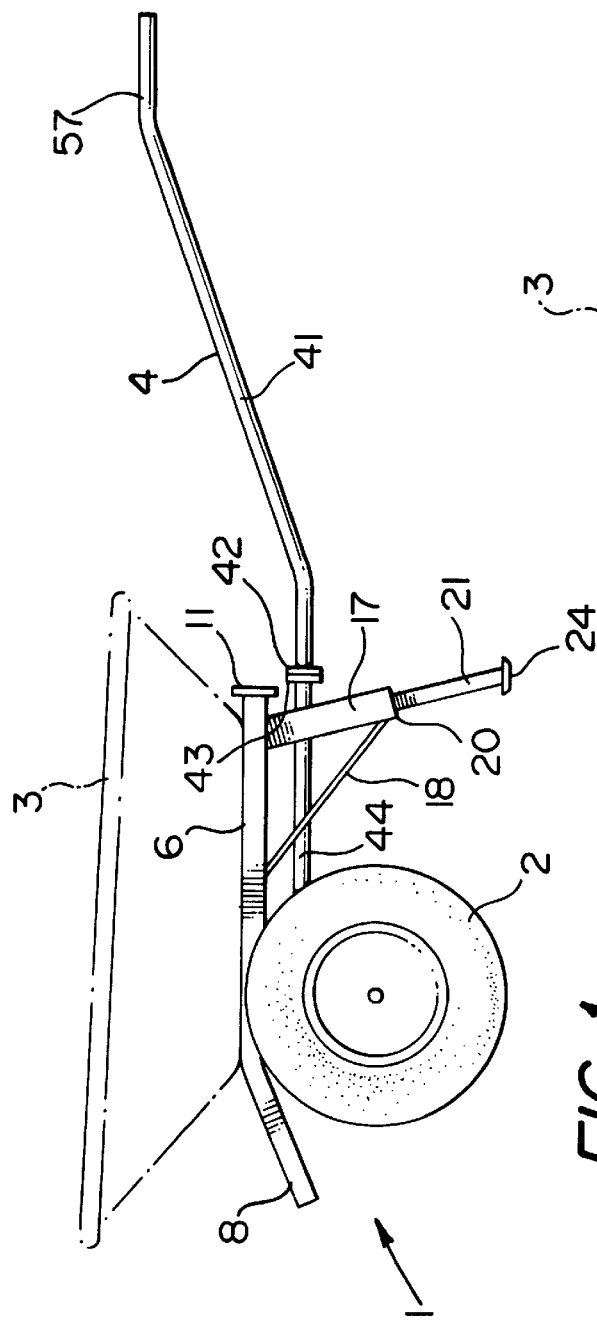
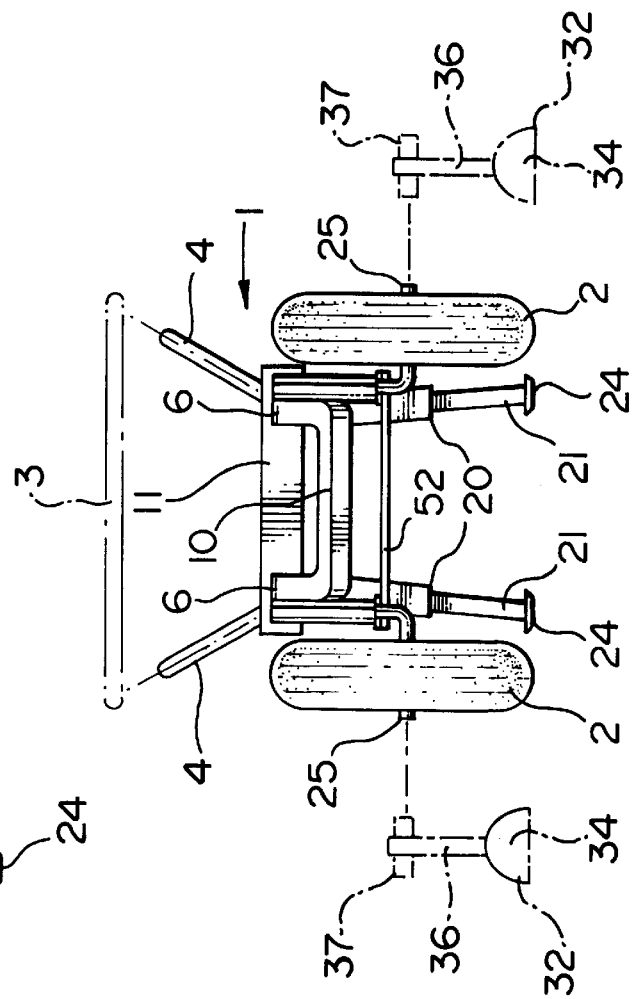
FIG. 1
FIG. 2

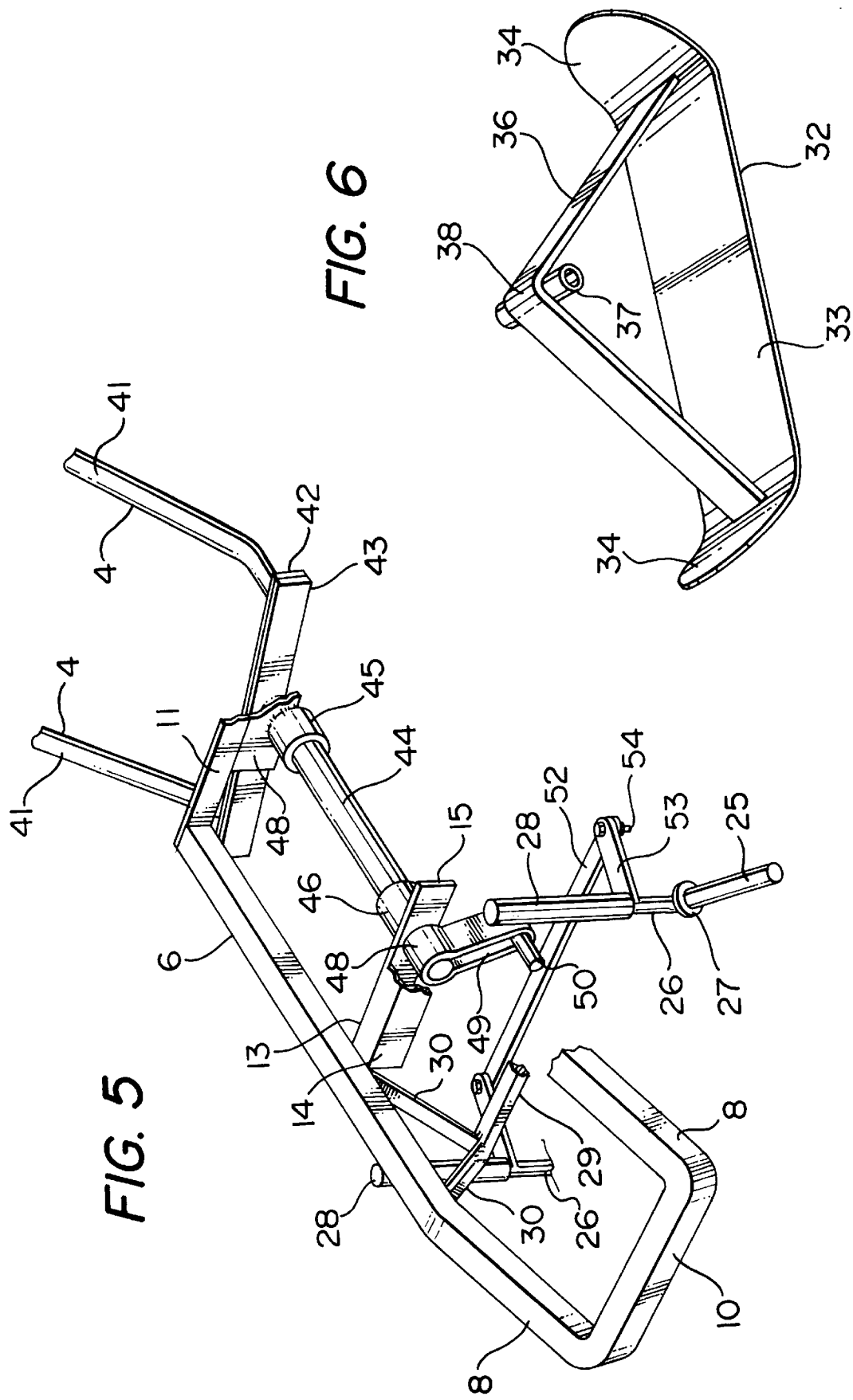

WHEELBARROW

BACKGROUND OF THE INVENTION

1. Field of the Invention

This invention relates to a wheelbarrow, and in particular to a steerable wheelbarrow.

2. Discussion of the Prior Art

In general, conventional wheelbarrows are difficult to steer, particularly when filled with a heavy load. The problem of steering becomes more difficult as the weight of the load increases. When using a single wheeled vehicle, a heavy load often results in tipping of the wheelbarrow when turning. A two-wheeled wheelbarrow provides a solution to the stability problem, but not to the turning problem. Such a wheelbarrow is disclosed by Canadian Patent No. 1,279,340, which issued to P. Donze et al on Jan. 22, 1991. A variety of steering mechanisms for small carts or the like which, at least in theory, could be used for wheelbarrows are described in U.S. Pat. Nos. 2,559,142, which issued to J. O. Woodworth on Jul. 3, 1951; 3,066,945, which issued to W. L. Prescott on Dec. 4, 1962; 3,871,464, which issued to J. W. Eden on Mar. 18, 1975 and 4,203,609, which issued to T. L. Mitchell et al on May 20, 1980.

While some of the patented devices are interesting, they are either too complicated in terms of structure or ill-adapted for use on a wheelbarrow.

GENERAL DESCRIPTION OF THE INVENTION

An object of the present invention is to provide a wheelbarrow which is both stable and relatively easy to steer.

Another object of the invention is to provide a wheelbarrow which is structurally simple, and thus easy to mass produce at relatively low cost.

Accordingly, the invention relates to a wheelbarrow comprising:

(a) frame means;

(b) container means on said frame means for carrying a load;

(c) axle means proximate a front end of said frame means rotatable around a vertical axis on said frame means;

(d) wheel means rotatable on said axle means;

(e) lever means on said axle means;

(f) handle means independent of and extending rearwardly from said frame means;

(g) shaft means carried by said handle means rotatable in and said frame means, whereby said handle means and said shaft means can be used to lift a rear end of said frame means; and (h) linkage means connecting said shaft means to said lever means, whereby rotation of said handle means and consequently said shaft means results in movement of said lever means and consequently rotation of said axle means and wheel means to steer the wheelbarrow.

BRIEF DESCRIPTION OF THE DRAWINGS

This invention is described hereinafter in greater detail with reference to the accompanying drawings, which illustrate a preferred embodiment of the invention, and wherein:

FIG. 1 is a side view of a wheelbarrow in accordance with the present invention;

FIG. 2 is a front end view of the wheelbarrow of FIG. 1;

FIG. 5 is a partly sectioned, isometric view of a frame and steering mechanism used in the wheelbarrow of FIGS. 1 and 2;

FIG. 6 is an isometric view of a ski used on the wheelbarrow of FIGS. 1 and 2;

It should be noted that for the sake of simplicity and to facilitate an understanding of the invention various elements have been omitted from some figures of the drawings.

DESCRIPTION OF THE PREFERRED EMBODIMENT

With reference to FIGS. 1 and 2, the basic elements of the wheelbarrow of the present invention include a frame generally indicated at 1 supported by a pair of wheels 2, a container 3 mounted on the frame and handles 4 for lifting one end of the frame 1 and for steering the wheelbarrow.

Figure 3:
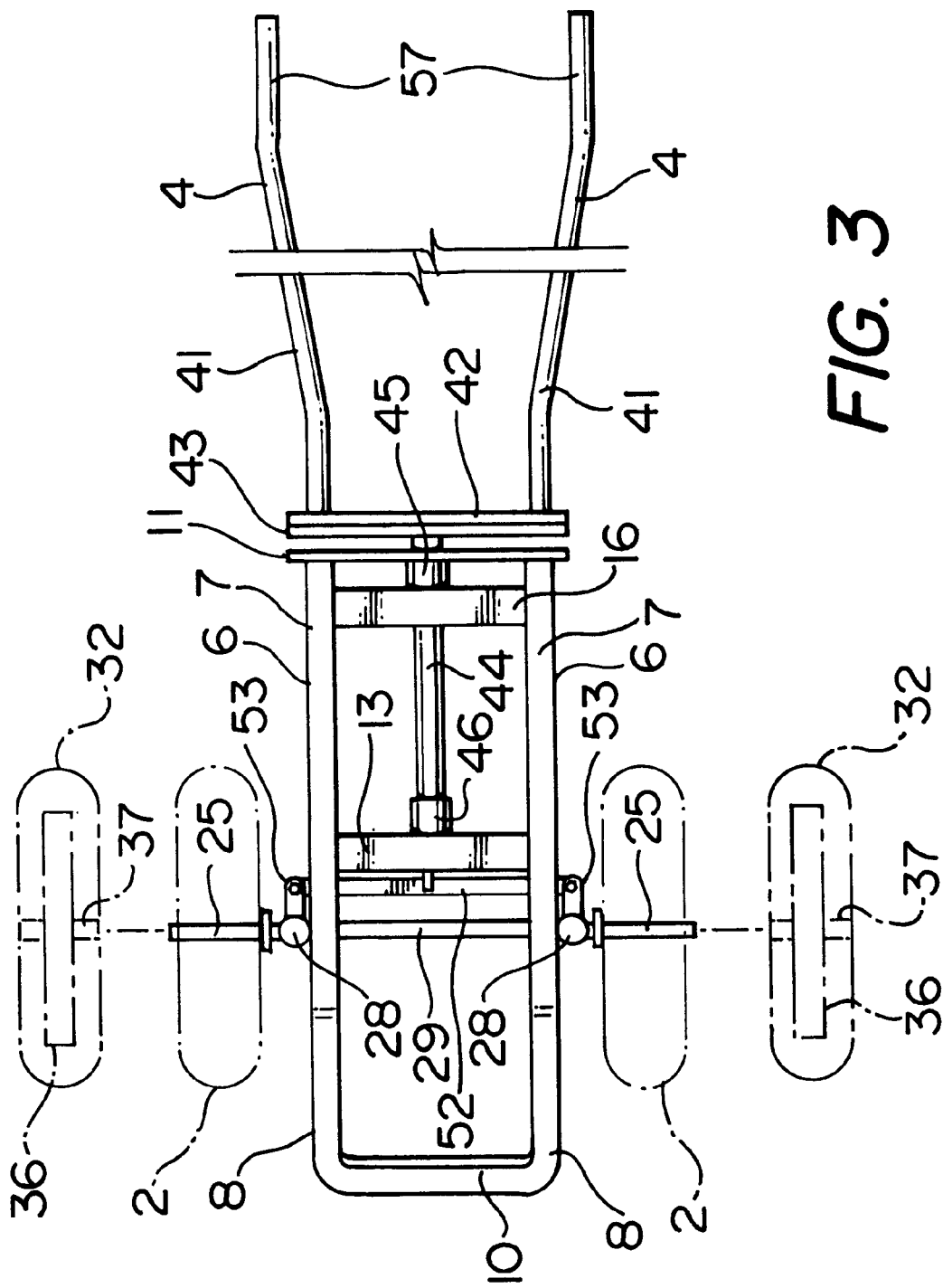
FIG. 3 is a top view of the wheelbarrow of FIGS. 1 and 2 with parts omitted.
Figure 4:
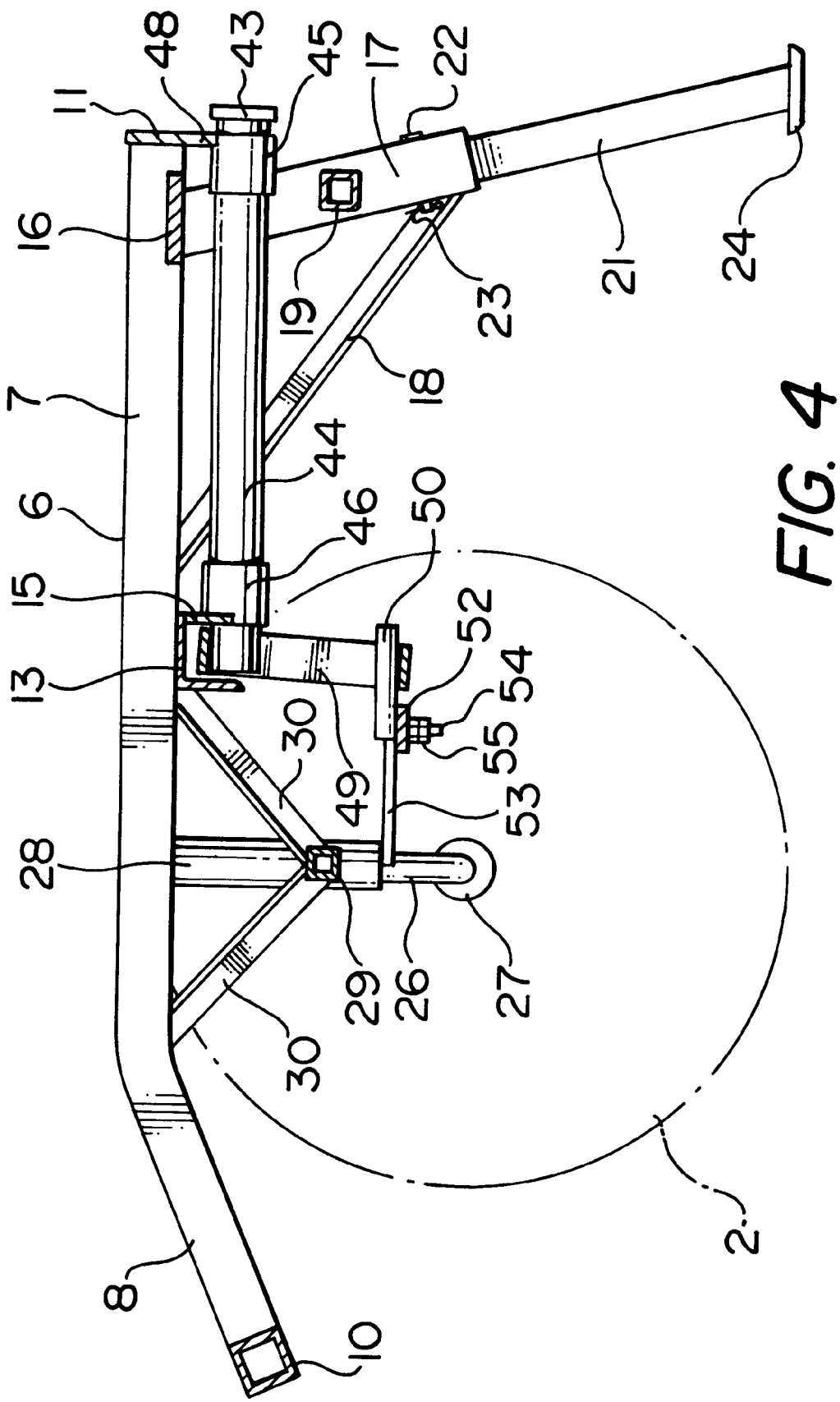
FIG. 4 is a partly sectioned view of a frame and steering mechanism used in the wheelbarrow of FIGS. 1 and 2.
Figure 7:
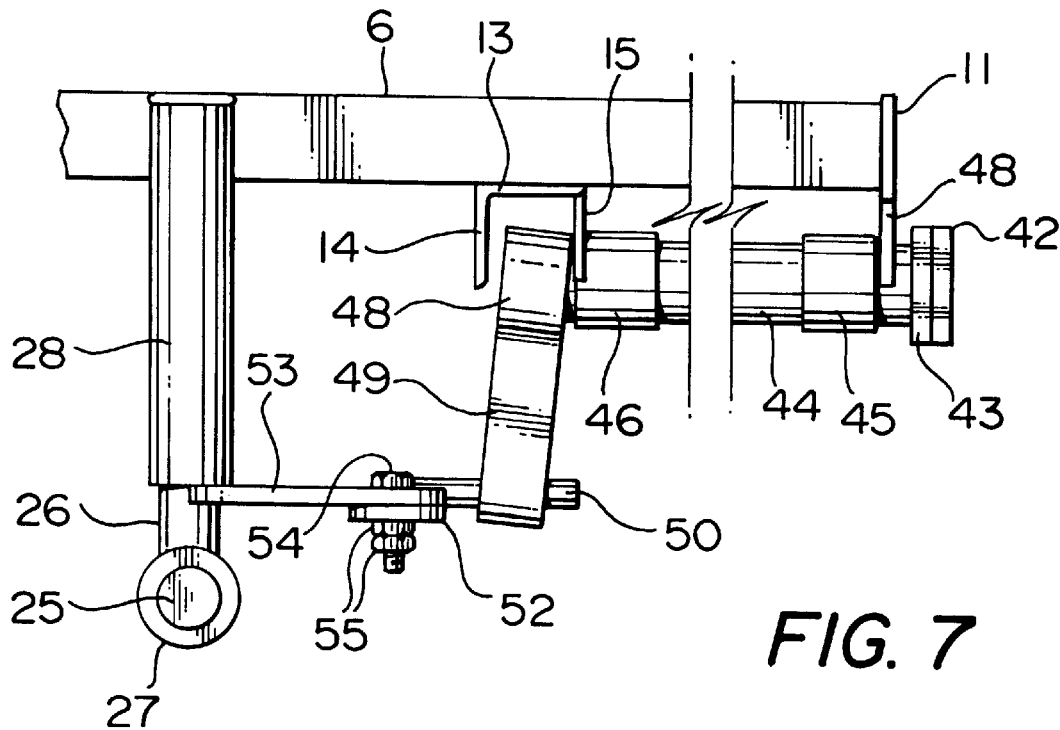
FIG. 7 is a side view of the steering mechanism of FIGS. 4 and 5.
Figure 8:
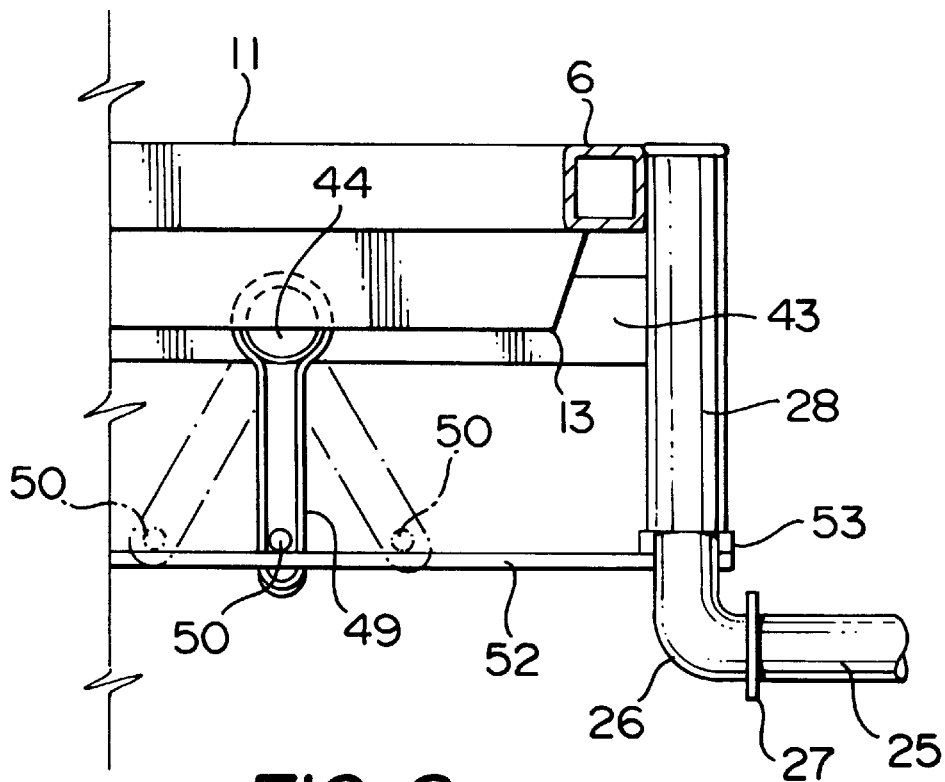
FIG. 8 is an cross section of one side of the steering mechanism as seen from the left of FIG. 6.

As best shown in FIGS. 3 and 4, the frame 1 is defined by a pair of parallel sides 6 with straight rear ends 7 and downwardly inclined front ends 8. The front ends 8 of the sides 6 are interconnected by a front crossbar 10 integral with the sides 6, and the rear ends 7 are interconnected by a rear crossbar 11 in the form of a strip of steel welded to the free ends of the sides. The sides 6 and the front crossbar 10 are formed of a single length of square cross section steel tube. The crossbar 10 acts as a fulcrum for supporting the frame 1 when the wheelbarrow is tilted around the horizontal axis of the wheels 2 during a dumping operation. An intermediate crossbar 13 defined by a length of angle iron 14 and a steel strip 15 extend across the center of the frame 1 between the sides 6. A second, rear crossbar 16 extends between the sides 6 proximate the rear ends thereof for strengthening the frame.

Inclined, square cross section tubes 17 extend downwardly, rearwardly and slightly outwardly from the sides 6 at the ends of the rear crossbar 16. A diagonal brace 18 extends from the bottom of each side 6 to the bottom of each tube 17, and a crossbar 19 (FIG. 4) extends between the tubes 17 at their midpoints. The tubes 17 define the top ends of a pair of legs 20 (FIGS. 1 and 2) for supporting the rear end of the frame 1. The legs 20 are completed by lower tube sections 21 which are slidable in the tubes 17. The tube sections 21 are retained in the tubes 17 by straight pins 22 (FIG. 4) and a cotter pin 23 extending through a diametrically extending hole (not shown) in the narrow (non-head) end of the pin. By providing a plurality of aligned holes (not shown) in the tube 17 or the section 21, the position of the section 21, i.e. the length of the legs 20 can be adjusted. A square foot 24 with bevelled edges is provided on the bottom free end of each leg 20.

The wheels 2 are rotatably mounted on the horizontal arms 25 of L-shaped axles 26. Rings 27 (FIGS. 4, 5, 7 and 8) are provided on the inner ends of the horizontal arms 25 of the axles 26 for limiting movement of the wheels 2 onto such arms. The vertical arms of the axles 26 are rotatably mounted in sleeves 28, the closed top ends of which are welded to the sides 6 in front of the intermediate crossbar 13. A crossbar 29 extends between the bottom ends of the sleeves 28, and diagonal braces 30 (FIGS. 4 and 5) extend between the ends of the crossbar 29 and the bottoms of the sides 6 to strengthen the structure.

As shown in FIGS. 2 and 3, the wheels 2 can be replaced by skis 32 so that the wheelbarrow can be used in the winter. Referring to FIG. 6, each ski 32 includes an elongated base 33 with upwardly curving ends 34. An inverted V-shaped bar 36 is mounted on the base 33, extending substantially the entire length thereof. A short tube 37 is welded in the apex 38 of the bar 36 for mounting the ski 32 on the axle 26. A diametrically extending hole (not shown) is provided in the horizontal arm 25 of each axle 26 for receiving a cotter pin, which retains the wheel 2 or the ski 32 on the axle.

The wheelbarrow is moved and steered by means of the pair of handles 4 defined by elongated bars 41 interconnected at their front ends by a pair of crossbars 42 and 43. One crossbar 42 is welded to the front ends of the handles 4. The crossbars 42 and 43 are releasably connected to each other by bolts and nuts (not shown). Thus, the handles 4 can be separated from the frame 1 and the legs 22 can be disassembled to make a more compact structure for packaging and shipping.

The free end of a shaft 44 is welded to the center of the crossbar 43. The shaft 44 extends forwardly through a pair of sleeves 45 and 46, which define cylindrical bushings axially aligned in a line parallel to the longitudinal axis of the frame 1. The rear sleeve 45 is welded to a plate 48 extending downwardly from the rear crossbar 11 of the frame 1. The front sleeve 46 is welded to the strip 15 of the intermediate crossbar 13.

As best shown in FIGS. 4 and 5, the shaft 44 extends forwardly beyond the plate 15, i.e. into the open bottom of the crossbar 13. The top end 48 of a keyhole-shaped connector 49 is welded to the front, free end of the shaft 43. The rear end of a rod 50 is loosely mounted in the connector 49. The other end of the rod 50 is welded to the center of a crossbar defined by an arm 52. A pair of levers 53 are pivotally connected to the ends of the arm 52 by bolts 54 and nuts 55. The levers 53 extend rearwardly from the bottom ends of the vertical arms of the axles 26. Thus, as best shown in FIG. 5, the connector 49, the rod 50 and the arm 52 form a linkage between the shaft 44 and the levers 53, so that rotation of the shaft 44 results in a corresponding rotation of the connector 49, and transverse movement of the arm 52 to cause rotation of the levers 53 and the axles 26 in unison, i.e. steering of the wheelbarrow by turning of the wheels 2 or the skis 32.

In use, the outer free ends 57 (FIGS. 1 and 3) of the handles 4 are grasped and lifted simultaneously to raise the rear end of the wheelbarrow so that the container 3 and any load therein are supported by the wheels 2 or the skis 32 in the conventional manner. The wheelbarrow is then pushed or pulled to move the load from one location to another. In order to change the direction of travel of the wheelbarrow, the handles 40 are. tilted transversely to the longitudinal axis of the frame 1 by applying a slight downward pressure to one handle while lifting the other handle. These actions cause rotation of the shaft 44 in the sleeves 45 and 46. As mentioned above, such rotation of the shaft 44 results in a corresponding rotation of the connector 49 (FIG. 8), transverse movement of the arm 52, and rotation of the levers 53 and the axles 26. Rotation of the axles 26 around the vertical longitudinal axes of the sleeves 28 results in turning of the wheels 2 or the skis 32 to effect turning of the wheelbarrow.

It will be appreciated that the basic structure described above can be used in a wheelbarrow which is not steerable. In such case, the handles 4 are fixed to the frame 1, and the shaft and linkage to the axles are omitted. Moreover, the axles can be replaced by a single straight axle extending across the frame.

We claim:

1. A wheelbarrow comprising:
   (a) frame means;
   (b) container means on said frame means for carrying a load;
   (c) axle means proximate a front end of said frame means rotatable around a vertical axis on said frame means;
   (d) wheel means rotatable on said axle means;
   (e) lever means on said axle means;
   (f) a pair of handles independent of and extending rearwardly from said frame means;
   (g) shaft means carried by said handles rotatable in said frame means, whereby said handles and said shaft means can be used to lift a rear end of said frame means; and
   (h) linkage means connecting said shaft means to said lever means, whereby rotation of said handles and consequently said shaft means results in movement of said lever means and consequently rotation of said axle means and wheel means to steer the wheelbarrow.

2. The wheelbarrow of claim 1, including sleeve means on said frames means for rotatably supporting said axle means.

3. The wheelbarrow of claim 2, wherein said axle means is L-shaped, including vertical arm means rotatable in said sleeve means, and horizontal arm means for rotatably carrying said wheel means.

4. The wheelbarrow of claim 3, including stop means on said horizontal arm means for positioning said wheel means on the axle means.

5. A wheelbarrow comprising:
   (a) frame means;
   (b) container means on said frame means for carrying a load;
   (c) a pair of axle means proximate a front end of said frame means rotatable around vertical axes on said frame means;
   (d) wheel means rotatable on each said axle means;
   (e) lever means on each said axle means;
   (f) a pair of handles independent of and extending rearwardly from said frame means;
   (g) shaft means carried by said handles rotatable in said frame means, whereby said handles and said shaft means can be used to lift a rear end of said frame means; and
   (h) linkage means connecting said shaft means to said lever means, whereby rotation of said handles and consequently said shaft means results in movement of said lever means and consequently rotation of said axle means and wheel means in unison to steer the wheelbarrow.

6. The wheelbarrow of claim 5, including a pair of vertical sleeve means on said frame means for rotatably supporting said axle means.

7. The wheelbarrow of claim 6, wherein each said axle means being L-shaped, including vertical arm means rotatable in said sleeve means, and horizontal arm means for rotatably carrying said wheel means.

8. The wheelbarrow of claim 5, wherein said linkage means includes vertical connector means on a front end of said shaft means; and horizontal first crossbar means pivotally connecting said connector means to said lever means, whereby rotation of said shaft means causes rotation of said connector means, movement of said first crossbar means and rotation of said lever means and axle means around the longitudinal axis of said sleeve means to turn said wheel means and consequently steer the wheelbarrow.

9. The wheelbarrow of claim 8, including bushing means on said frame means carrying said shaft means.

10. The wheelbarrow of claim 9, wherein said bushing means includes a pair of cylindrical bushings axially aligned with the longitudinal axis of said frame means.

11. The wheelbarrow of claims 1, 2, 3, 4, 5, 6, 7, 8, 9 or 10, including ski means for replacing said wheel means on said axle means, whereby the wheelbarrow can be used on snow or ice.

12. The wheelbarrow of claim 8, including second crossbar means on the front end of said handles; and third crossbar means on the rear end of said frame means releasably connected to said second crossbar means, whereby the wheelbarrow can be partially disassembled.

13. The wheelbarrow claim 12, including extensible leg means on a rear end of said frame means for supporting the frame means in a stationary position.

14. The wheelbarrow of claim 13, wherein said leg means include telescopically interconnected tube means permitting changing of the length of and disassembly of the leg means.

* * * * *